(12) United States Patent
Meier et al.

(10) Patent No.: US 8,970,690 B2
(45) Date of Patent: Mar. 3, 2015

(54) METHODS AND SYSTEMS FOR DETERMINING THE POSE OF A CAMERA WITH RESPECT TO AT LEAST ONE OBJECT OF A REAL ENVIRONMENT

(75) Inventors: Peter Meier, München (DE); Selim Ben Himane, München (DE); Stefan Misslinger, Reith im Alpbachtal (AT); Ben Blachnitzky, München (DE)

(73) Assignee: Metaio GmbH, Munich (DE)

( * ) Notice: Subject to any disclaimer, the term of this patent is extended or adjusted under 35 U.S.C. 154(b) by 1114 days.

(21) Appl. No.: 12/371,490

(22) Filed: Feb. 13, 2009

(65) Prior Publication Data

US 2010/0208057 A1    Aug. 19, 2010

(51) Int. Cl.
*H04N 7/18* (2006.01)
*G06T 7/00* (2006.01)
(Continued)

(52) U.S. Cl.
CPC ............. *G06T 7/0046* (2013.01); *G06T 19/006* (2013.01); *H04N 5/2224* (2013.01); *G06T 2207/20092* (2013.01); *G06T 2207/30244* (2013.01); *G06T 2210/04* (2013.01)
USPC ................... 348/135; 348/416.1; 348/208.14; 345/158; 345/636

(58) Field of Classification Search
CPC . G06T 7/0046; G06T 19/006; G06T 2210/04; G06T 2207/20092; G06T 2210/30244; H04N 5/2224
USPC .......... 348/135, 416.1, 208.14; 345/158, 633
See application file for complete search history.

(56) References Cited

U.S. PATENT DOCUMENTS

| 6,765,569 B2 | 7/2004 | Neumann et al. |
| 7,002,551 B2 | 2/2006 | Azuma et al. |

(Continued)

FOREIGN PATENT DOCUMENTS

| CN | 1662934 A | 8/2005 |
| CN | 101262830 A | 9/2008 |

(Continued)

OTHER PUBLICATIONS

Honkamaa et al. "Interactive outdoor mobile augmentation using markerless tracking and GPS," VTT Technical Research Centre of Finald, 4 pages.

(Continued)

*Primary Examiner* — Thuong Nguyen
(74) *Attorney, Agent, or Firm* — ARC IP Law, PC; Joseph J. Mayo

(57) ABSTRACT

Method for determining the pose of a camera with respect to at least one object of a real environment for use in authoring/augmented reality application that includes generating a first image by the camera capturing a real object of a real environment, generating first orientation data from at least one orientation sensor associated with the camera or from an algorithm which analysis the first image for finding and determining features which are indicative of an orientation of the camera, allocating a distance of the camera to the real object, generating distance data indicative of the allocated distance, determining the pose of the camera with respect to a coordinate system related to the real object of the real environment using the distance data and the first orientation data. May be performed with reduced processing requirements and/or higher processing speed, in mobile device such as mobile phones having display, camera and orientation sensor.

26 Claims, 12 Drawing Sheets
(4 of 12 Drawing Sheet(s) Filed in Color)

(51) Int. Cl.
*G06T 19/00* (2011.01)
*H04N 5/222* (2006.01)

(56) References Cited

U.S. PATENT DOCUMENTS

| | | | |
|---|---|---|---|
| 2002/0075201 A1* | 6/2002 | Sauer et al. | 345/7 |
| 2002/0154812 A1* | 10/2002 | Chen et al. | 382/154 |
| 2004/0105573 A1* | 6/2004 | Neumann et al. | 382/103 |
| 2004/0189675 A1* | 9/2004 | Pretlove et al. | 345/633 |
| 2005/0018058 A1* | 1/2005 | Aliaga et al. | 348/239 |
| 2005/0157931 A1* | 7/2005 | Delashmit et al. | 382/190 |
| 2006/0090135 A1 | 4/2006 | Fukuda | |
| 2006/0146142 A1* | 7/2006 | Arisawa et al. | 348/211.11 |
| 2007/0159527 A1* | 7/2007 | Kim et al. | 348/97 |
| 2008/0075358 A1* | 3/2008 | Yu et al. | 382/154 |
| 2008/0239076 A1* | 10/2008 | Luo | 348/148 |
| 2008/0316203 A1* | 12/2008 | Sandor et al. | 345/419 |
| 2009/0183930 A1* | 7/2009 | Yang et al. | 178/18.03 |
| 2009/0190798 A1* | 7/2009 | Lee et al. | 382/103 |
| 2009/0208054 A1* | 8/2009 | Angell et al. | 382/103 |
| 2010/0033404 A1* | 2/2010 | Hamadou et al. | 345/8 |
| 2010/0045701 A1* | 2/2010 | Scott et al. | 345/633 |
| 2010/0194863 A1* | 8/2010 | Lopes et al. | 348/50 |
| 2010/0208057 A1* | 8/2010 | Meier et al. | 348/135 |
| 2010/0309311 A1* | 12/2010 | Svanholm | 348/135 |
| 2011/0292167 A1* | 12/2011 | Altieri | 348/40 |

FOREIGN PATENT DOCUMENTS

| | | |
|---|---|---|
| CN | 101262830 A | 9/2008 |
| WO | 2007/011314 A2 | 1/2007 |
| WO | 2007/011314 A2 | 1/2008 |

OTHER PUBLICATIONS

Kahkonen et al. "Intergrating Buliding Product Models With Live Video Stream," International Conference on Construction Applicatins of Virtual Reality: Oct. 22-23, 2007, 13 pg.
Georgel et al. "How to Augment the Second Image? Recovery of the Translation Scale in Image to Image Registration", 2 pages.
Saaski et al. "Integration of Design and Assembly Using Augmented Reality," VTT Technical Reasearch Centre of Finland, 10 pages.
Lee et al. "Handy AR: Markerless Inspectioin of Augmented Reality Objects Using Fingertip Tracking," University of Claifornia, 8 pages.
Honkamaa et al. "A Lightweight Approach for Augmented Reality on Camera Phones Using 2D Images to Simulate 3D", 5 pages.
Welch et al. "SCAAT: Incremenatl Tracking with Incomplete Information," University of North Carolina at Chapel Hill, 12 pages.
Reitmayr et al. "Going out: Robust Model-based Tracking for Outdoor Augmented Reality," Engineering Department, Cambridge University, UK, 10 pages.
Reitmayr et al. "Initialisation for Visual Trackingin Urban Environments," Engineering Department, Cambridge University, UK, 9 pages.
Hakkarainen et al. "Augmented Assembly using a Mobile Phone," VTT Technical Reasearch Centre of Finland, 2 pages.
Lobo et al. "Vision and Inertial Sensor Cooperation Using Gravity as a Vertical Reference," IEEE Trans. Pattern Analysis and Machine Intelligence, 25.12 (2003): 1597-1608, US.
Nielsen et al. "Mobile Augmented Reality Support for Architects," ICCS 2004, LNCS 3038 (May 2004): 921-928, Springer-Verlag, Berlin/Heidelberg.
Honkamaa et al. "Interactive Outdoor Mobile Augmentation Using Markerless Tracking and GPS," Proc. Virtual Reality International Conference, Apr. 2007, Laval France, 4 pgs.
Mogensen. "Documentation of Infrastructure," Deliverable 17—WS-UAA-21, WorkSPACE IST-2000-25290, Jan. 30, 2004, pp. 9-10.
Steinicke et al. "Multi-Touching 3D Data: Towards Direct Interaction in Stereoscopic Display Environments coupled with Mobile Devices," AVI 2008, May 2008, Italy, 4 pgs.
Moscovich. "Principles and Applications of Multi-touch Interaction," PhD Thesis for Dept. Computer Sci. Brown University, May 2007, pp. 78-82, US.
Georgel. "How to Augment the Second Image?" IEEE Int. Symp. Mixed and Augmented Reality 2008, Sep. 15-18, pp. 171-172, IEEE 2008, UK.
Kato. "A City-Planning System based on Augmented Reality with a Tangible Interface," Proc. of ISMAR '03, IEEE, Oct. 7, 2003, US, 2 pgs.
Piekarski. "Interactive 3D Modelling in Outdoor Augmented Reality Worlds," PhD Thesis for Univ. South Australia, Chps. 2, 4, 5, Internet (Feb. 2004), Australia.
International Search Report, dated Oct. 4, 2010.
Koch et al. "Markerless image-based 3D tracking for real-time augmented reality applications," Institute of Computer Science and Applied Mathematics University of Kiel, 4 pgs.
"Deliverable 16; Documentation of Appliances & Interaction devices", Jan. 30, 2004, retrieved from the Internet: URL:http://www.daimi.au.dk/worksppace/site/content/deliverables/AppliancesAndInteractionDevices-D16.pdf on Mar. 17, 2014, 22 pages.
European Office Action issued for EP Appl No. 10713797.8, dated Mar. 26, 2014, 7 pages.
Chinese Office Action issued for CN Application No. 201080016314.0 received on Sep. 4, 2013, 17 pages. (English Translation).
Chinese Office Action issued for CN Appl No. 201080016314.0, dated Apr. 14, 2014, 16 pages.

\* cited by examiner

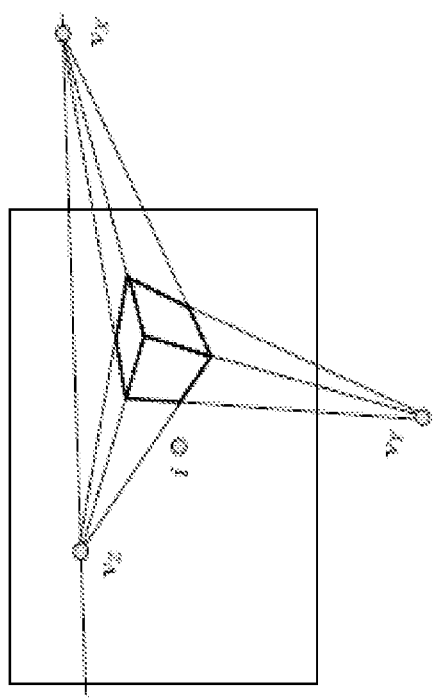

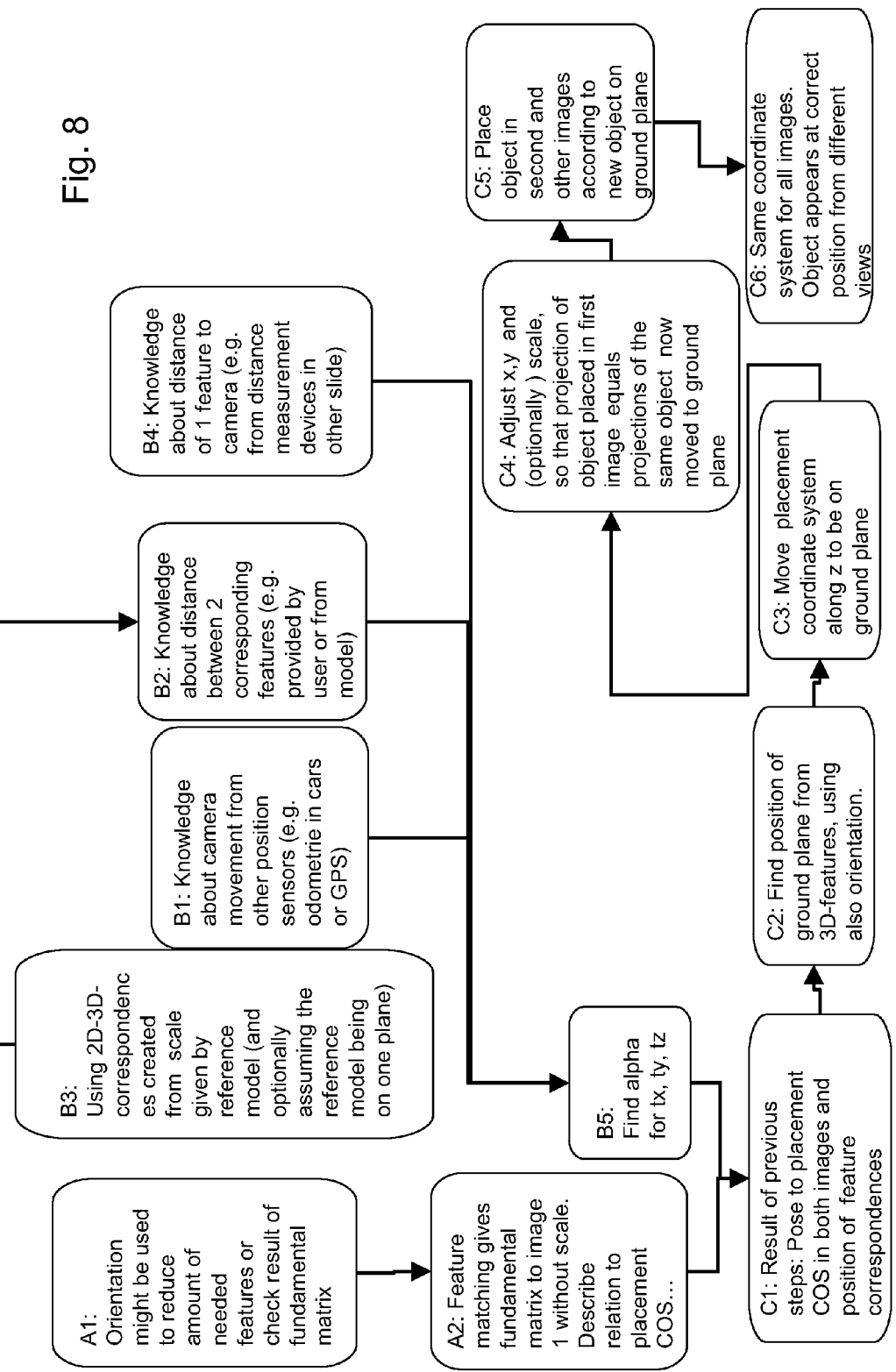

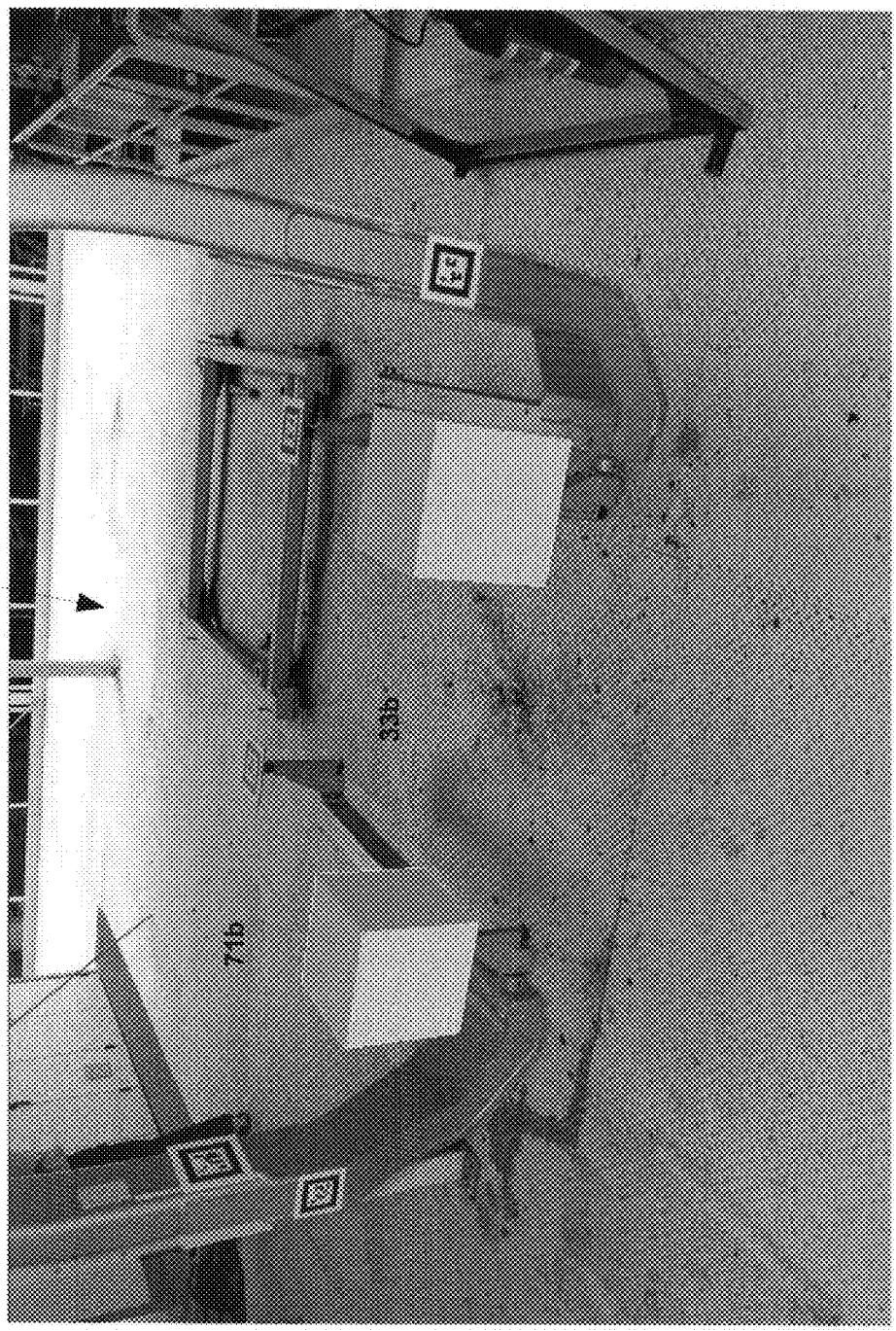

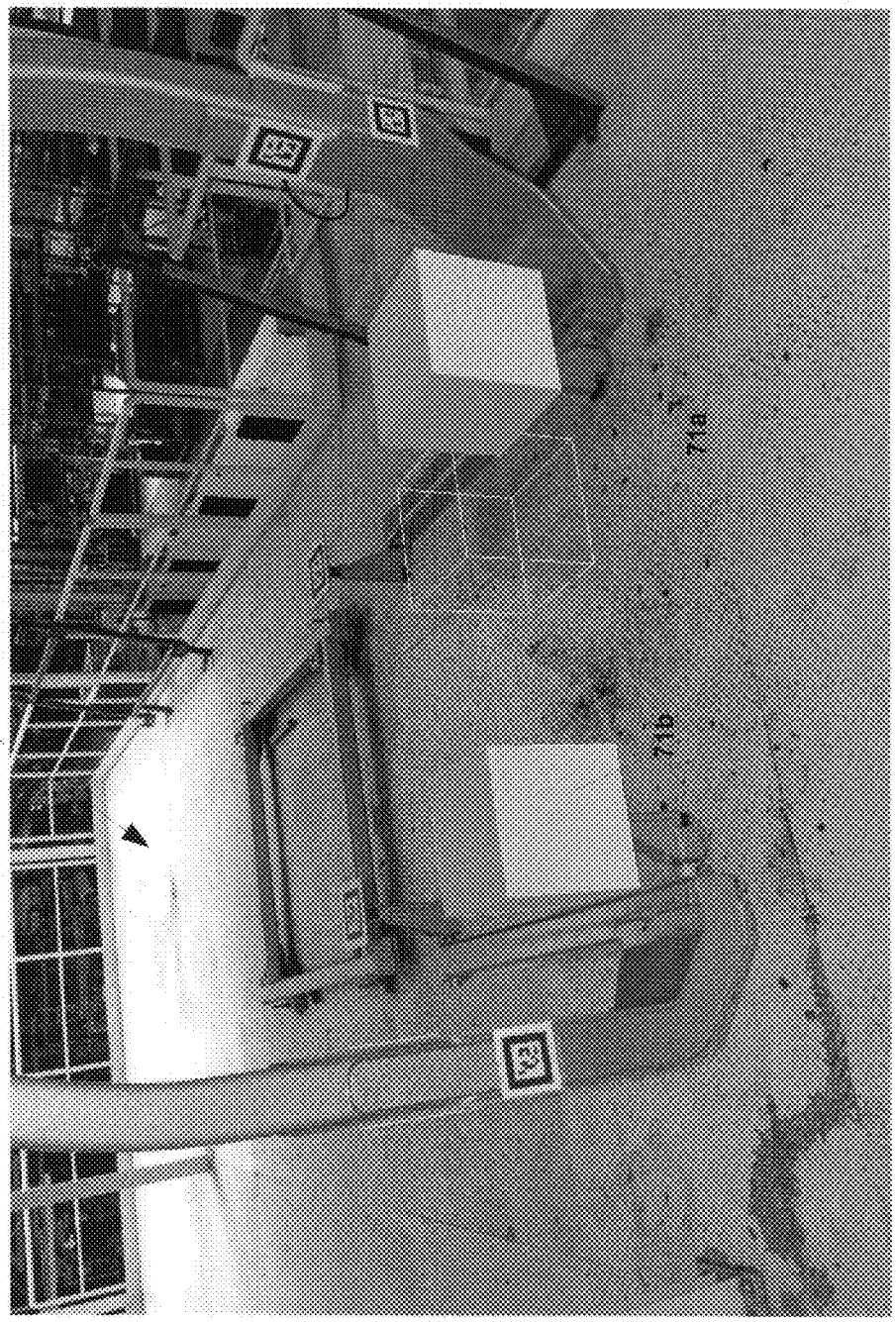

METHODS AND SYSTEMS FOR DETERMINING THE POSE OF A CAMERA WITH RESPECT TO AT LEAST ONE OBJECT OF A REAL ENVIRONMENT

BACKGROUND OF THE INVENTION

1. Field of the Invention

The invention is directed to methods and systems for determining the pose of a camera with respect to at least one object of a real environment for use in an authoring, e.g. for geospatial databases, or augmented reality application, wherein at least one or two images are generated by the camera capturing a real object of a real environment. According to the determined pose of the camera, the image or images may by augmented with virtual objects according to the authoring or augmented reality technology.

2. Description of the Related Art

Applications are known which augment an image or images generated by at least on camera with virtual objects using the so-called Augmented Reality (AR) technology. In such application, a camera coupled to a processing unit such as a microprocessor takes a picture of a real environment, wherein the real environment is displayed on a display screen and virtual objects may be displayed in addition to the real environment, so that the real environment displayed on the display screen is augmented with virtual objects of any kind on a display screen. In such application, in order to augment the image with virtual objects, there is the need for the microprocessor to determine the position and orientation (so-called pose) of the camera with respect to at least one object of the real environment in order for the microprocessor to correctly augment the captured image with any virtual objects. In this context, correctly augmenting the captured image with any virtual objects means that the virtual objects are displayed in a manner that the virtual objects fit in a perspectively and dimensionally correct fashion into the scene of the image.

A known method for determining the pose of the camera uses a virtual reference model of a corresponding part of the real environment captured by the camera, wherein the virtual reference model is projected into the image, using an initially known approximation of the pose, and superimposed with the corresponding part of the real environment. A tracking algorithm of the image processing then uses the virtual reference model to determine the pose of the camera with respect to the real environment, for example by feature detection and comparison between the reference model and the corresponding part of the real environment.

Another known method for determining the pose of the camera uses a marker that is placed in the real environment and captured by the camera when taking the image. A tracking algorithm of the image processing then uses the marker to determine the pose of the camera with respect to the real environment, particularly by analysing of the marker in the image using known image processing methods.

A disadvantage of the above-mentioned methods is that either a virtual reference model has to be conceived first and stored, which is very time and resource consuming and almost impossible if the AR technology shall be capable of being used spontaneously in any real environment. With respect to using a marker, the user has to place in an initial step the marker in the real environment before taking the image, which is also time consuming and troublesome. Particularly, for these reasons these methods may hardly be used in connection with any consumer products, such as mobile phones having an integrated camera and display, or other mobile devices.

Moreover, from the prior art there are known so called structure from motion and simultaneous localization and tracking (SLAM) methods. All these methods serve for determining the position and orientation (pose) of a camera in relation to the real world or of part of the real world. If there is no pre-information available, in some cases it is not possible to determine the absolute pose of the camera in relation to the real world or part of the real world, but only the changes of the camera poses from a particular point of time. In the above-mentioned applications, SLAM methods may be used to get orientation from planar points, but a disadvantage is that one is not sure if ground plane or some other plane is identified. Further, with such methods one may only get an initial scale by translating the camera, e.g. along a distance of 10 cm, and communicating the covered distance to the system. Moreover, SLAM methods need at least two images (so-called frames) taken at different camera poses, and a calibrated camera.

Another known technology is disclosed in "Initialisation for Visual Tracking in Urban Environments", Gerhard Reitmayr, Tom W. Drummond, Engineering DepartmentCambridge, University Cambridge, UK (Reitmayr, G. and Drummond, T. W. (2007) *Initialisation for visual tracking in urban environments* In: 6th IEEE and ACM International Symposium on Mixed and Augmented Reality (ISMAR 2007), 13-16 Nov. 2007, Nara, Japan.). The model-based tracking system is integrated with a sensor pack measuring 3D rotation rates, 3D acceleration and 3D magnetic field strength to be more robust against fast motions and to have an absolute orientation reference through gravity and the magnetic field sensor. Sensor fusion is implemented with a standard extended Kalman filter using a constant velocity model for the camera pose dynamics. Different inputs such as a camera pose from the tracking system or measurements from the sensor pack are incorporated using individual measurement functions in a SCAAT-style approach (Greg Welch and Gary Bishop. Scaat: incremental tracking with incomplete information. In *Proc. SIGGRAPH '97*, pages 333-344, New York, N.Y., USA, 1997. ACM Press/Addison-Wesley Publishing Co.).

Another technique is disclosed in "Robust Model-based Tracking for Outdoor Augmented Reality", Gerhard Reitmayr, Tom W. Drummond (Gerhard Reitmayr and Tom Drummond, Going Out: Robust Model-based Tracking for Outdoor Augmented Reality Proc. IEEE ISMAR'06, 2006, Santa Barbara, Calif., USA.) The tracking system relies on a 3D model of the scene to be tracked. In former systems the 3D model describes salient edges and occluding faces. Using a prior estimate of camera pose, this 3D model is projected into the camera's view for every frame, computing the visible parts of edges.

Another application known as "mydeco" available on the Internet exists in which an image showing a real environment may be augmented with virtual objects. However, this system needs to set the rotation of the ground plane, which is quite cumbersome to the user.

In "A Lightweight Approach for Augmented Reality on Camera Phones using 2D Images to Simulate 3D", Petri Honkamaa, Jani Jaeppinen, Charles Woodward, ACM International Conference Proceeding Series; Vol. 284, Proceedings of the 6th international conference on Mobile and ubiquitous multimedia, Oulu, Finland, Pages 155-159, Year of Publication: 2007, ISBN:978-1-59593-916-6 there is described that using manual interaction for the initialization purpose, particularly by means of a reference model and the user's manipulation thereof, is an appropriate way as the tracking initialization is an easy task for the user, but automating it would require pre-knowledge of the environment, quite much processing power and/or additional sensors. Furthermore, this kind of an interactive solution is independent of the environment, it can be applied "anytime, anywhere".

In U.S. Pat. No. 7,002,551 there is disclosed a method and system for providing an optical see-through Augmented Reality modified-scale display. It includes a sensor suite that includes a compass, an inertial measuring unit, and a video camera for precise measurement of a user's current orientation and angular rotation rate. A sensor fusion module may be included to produce a unified estimate of the user's angular rotation rate and current orientation to be provided to an orientation and rate estimate module. The orientation and rate estimate module operates in a static or dynamic (prediction) mode. A render module receives an orientation; and the render module uses the orientation, a position from a position measuring system, and data from a database to render graphic images of an object in their correct orientations and positions in an optical display. The position measuring system is effective for position estimation for producing the computer generated image of the object to combine with the real scene, and is connected with the render module. An example of the position measuring system is a differential GPS. Since the user is viewing targets that are a significant distance away (as through binoculars), the registration error caused by position errors in the position measuring system is minimized.

Therefore, it would be beneficial to provide a method and a system for determining the pose of a camera with respect to at least one object of a real environment for use in an authoring or augmented reality application which may be performed with reduced processing requirements and/or at a higher processing speed and, more particularly, to provide methods of authoring 3D objects without knowing much about the environment in advance and, where necessary, being able to integrate user-interaction to serve the pose estimation.

BRIEF SUMMARY OF THE INVENTION

Embodiments of the invention include the following aspects.

In a first aspect there is provided a method for determining the pose of a camera with respect to at least one object of a real environment for use in an authoring or augmented reality application, comprising the following steps: Generating at least one first image by the camera capturing a first object of a real environment, generating first orientation data from at least one orientation sensor associated with the camera or from an algorithm which analyses the first image for finding and determining features which are indicative of an orientation of the camera, providing a means for allocating a distance of the camera to the first object of the real environment displayed in the first image, the means generating distance data which are indicative of the allocated distance of the camera to the first object, and determining the pose of the camera with respect to a coordinate system related to the first object of the real environment using the distance data and the first orientation data.

In a second aspect, there is provided a method for determining the pose of a camera with respect to at least one object of a real environment for use in an authoring or augmented reality application, comprising the following steps: Generating at least one image by the camera capturing a object of a real environment, displaying the image on an image displaying means, generating orientation data from at least one orientation sensor associated with the camera or from an algorithm which analyses the image for finding features which are indicative of an orientation of the camera, providing a virtual reference model which is displayed superimposed with the real environment in the image and generating distance data from the reference model, the distance data being indicative of an allocated distance of the camera to the object, and determining the pose of the camera with respect to a coordinate system related to the object of the real environment using the distance data and the orientation data.

According to another aspect, there is provided a method for determining the pose of a camera with respect to at least one object of a real environment for use in an authoring or augmented reality application, comprising the following steps: Generating at least one image by the camera capturing an object of a real environment, generating orientation data from at least one orientation sensor associated with the camera or from an algorithm which analyses the image for finding and determining features which are indicative of an orientation of the camera, providing a measurement device associated with the camera for measuring at least one parameter indicative of the distance between the camera and the object, and determining the pose of the camera with respect to a coordinate system related to the object of the real environment on the basis of the at least one parameter and the orientation data.

According to another aspect, there is provided a method for determining the pose of a camera with respect to at least one object of a real environment for use in an authoring or augmented reality application, comprising: generating at least one first image by the camera capturing a real object of a real environment, generating first orientation data from at least one orientation sensor associated with the camera or from an algorithm which analyses the first image for finding and determining features which are indicative of an orientation of the camera or by user-interaction, providing a means for allocating a distance of the camera to the real object of the real environment displayed in the first image, the means generating distance data which are indicative of the allocated distance of the camera to the real object, and determining the pose of the camera with respect to a coordinate system related to the real object of the real environment using the distance data and the first orientation data. The method proceeds with generating a second image by a camera capturing the real object of the real environment, extracting at least one respective feature from the first image and the second image and matching the respective features to provide at least one relation indicative of a correspondence between the first image and the second image, providing the pose of the camera with respect to the real object in the first image, and determining the pose of the camera with respect to a coordinate system related to the real object in the second image using the pose of the camera with respect to the real object in the first image and the at least one relation, and extracting at least one respective feature from the first image and the second image for determining a ground plane in both the first and the second images and moving the placement coordinate system to be positioned on the ground plane.

A system for determining the pose of a camera with respect to at least one object of a real environment for use in an authoring or augmented reality system, may comprise the following components and features: at least one camera for generating at least one image capturing at least one object of a real environment, an image displaying device for displaying the image, means for generating orientation data from at least one orientation sensor associated with the camera or from an algorithm which analyses the image for finding and determining features which are indicative of an orientation of the camera, particularly at least one orientation sensor associated with the camera for generating orientation data of the camera, and a processing device coupled with the camera and with the image displaying device. The processing device is arranged to perform the following steps in interaction with the camera and the image displaying device: providing a virtual reference model which is displayed superimposed with the real environment in the image and generating distance data from the reference model, the distance data being indicative of an allocated distance of the camera to the object, receiving user's instructions via a user interface for manipulation of the reference model by the user placing the reference model at a particular position within the at least one image, and determining the pose of the camera with respect to a coordinate system related to the at least one object of the real environment using the distance data and the orientation data.

Another system for determining the pose of a camera with respect to at least one object of a real environment for use in an authoring or augmented reality system may comprises the following components and features: At least one camera for generating at least one image capturing at least one object of a real environment, means for generating orientation data from at least one orientation sensor associated with the camera or from an algorithm which analyses the image for finding and determining features which are indicative of an orientation of the camera, particularly at least one orientation sensor associated with the camera for generating orientation data of the camera, a measurement device associated with the camera for measuring a distance between the camera and the at least one object, and a processing device coupled with the camera, wherein the processing device is arranged for generating distance data from the measured distance, and for determining the pose of the camera with respect to a coordinate system related to the at least one object of the real environment using the distance data and the orientation data.

For example, the system is included in a mobile device, wherein the mobile device may be a mobile telephone.

The invention may use the fact that a number of mobile phones today offer various required components for Augmented Reality (AR), such as high resolution cameras and displays, accelerometers, orientation sensor, GPS, wireless connectivity by WLAN and/or radio links. Further aspects, embodiments and advantageous features of the invention are evident from the following disclosure of embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention will now be described in more detail in conjunction with the accompanying drawings that illustrate various embodiments of the invention.

FIG. 7 shows a diagram in terms of calculating an orientation from lines.

FIG. 8 shows a flowchart illustration of another embodiment of a method according to the invention for calculating a ground coordinate system when having two or more images taken by a camera.

FIGS. 9-12 show exemplary images when performing a process as shown in FIG. 8.

DETAILED DESCRIPTION OF THE INVENTION

Figure 3:
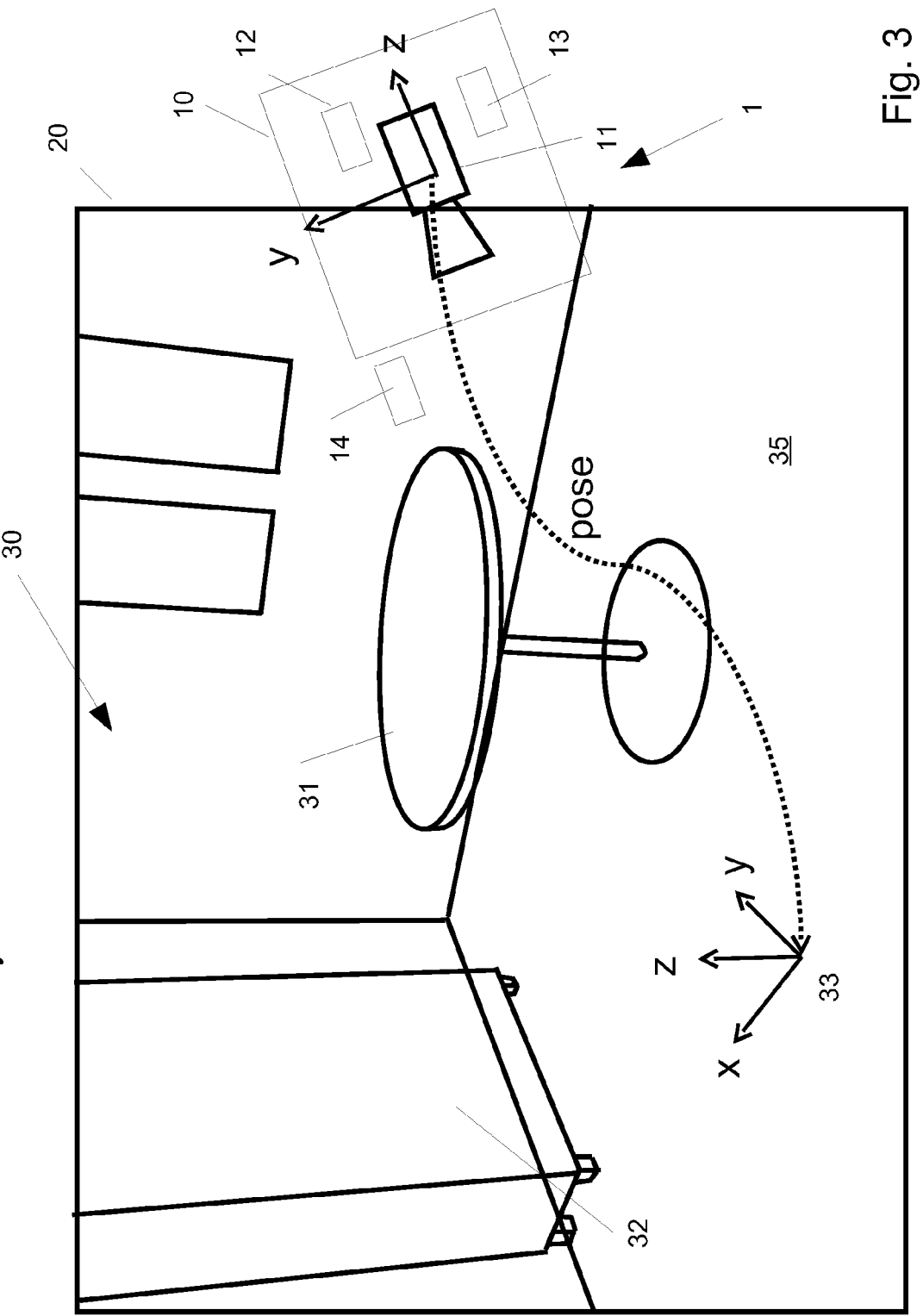
FIG. 3 shows a schematic illustration of an embodiment of a system and exemplary scenery according to the invention.
Figure 4:
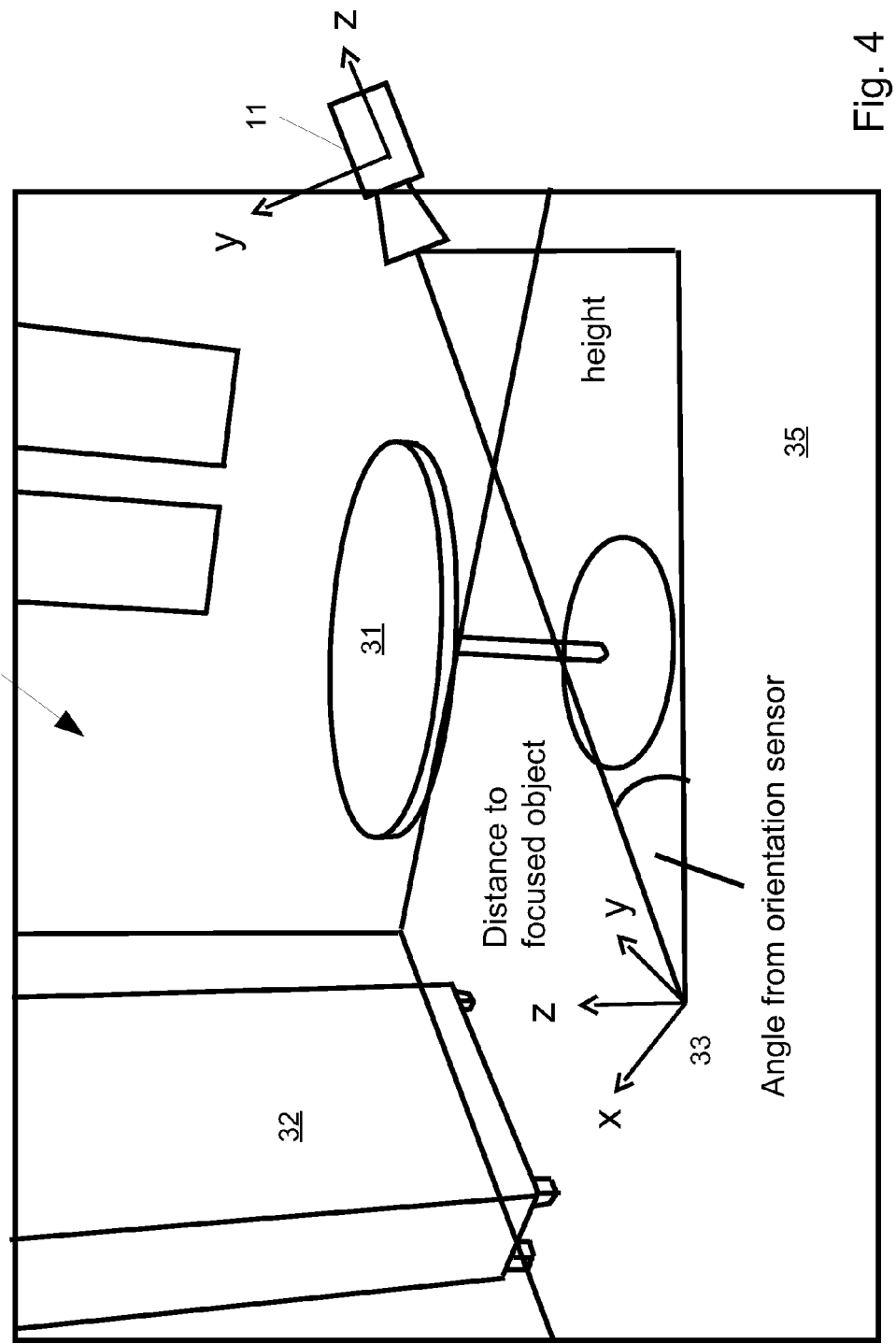
FIG. 4 shows another schematic illustration of an embodiment of a system and exemplary scenery according to the invention.
Figure 5:
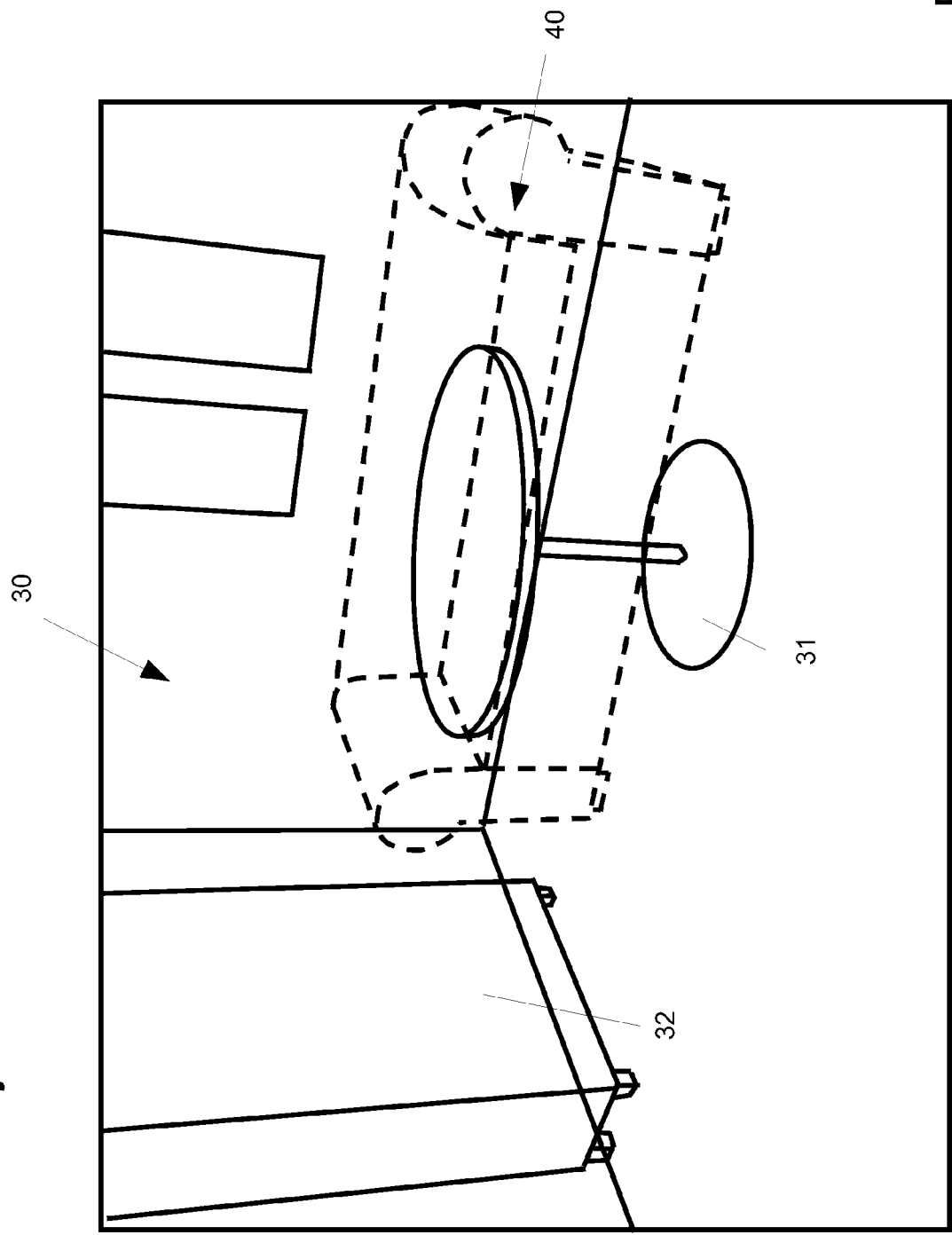
FIG. 5 shows a schematic illustration of the scenery of FIG. 3 augmented with a virtual object.

In FIGS. 3, 4 and 5 there is shown a schematic illustration of an embodiment of a system and an exemplary scenery according to the invention. Particularly, FIG. 3 shows a system 1 in which a user (not shown) holds a mobile device 10 which incorporates or is coupled with a camera 11 for generating at least one image 30 of the real world, for example containing the real objects 31, 32 as shown. According to a particular example, the real objects 31, 32 may be a table and a cabinet which are placed in a room having a ground plane 35, and the camera 11 takes an image of the real environment to be displayed on a display screen 20. The ground plane itself could also be considered to be a real object. After determining the pose, the real environment is provided with a coordinate system 33, such as shown in FIG. 3. Further, the camera 11 is coupled with an image displaying means 20, such as a touchscreen that is incorporated in the mobile device 10. However, any other image displaying means may be used which is suitable for displaying an image to a user, such as a head mounted display or any other type of mobile or stationary display device. Furthermore, a processing device 13, which may be for example a microprocessor, is connected with or incorporated in the mobile device 10. In the present example, the mobile device 10 also incorporates or is coupled with an orientation sensor 12. In a particular application, the mobile device may be a mobile telephone having an integrated orientation sensor 12, camera 11, touchscreen 20, and processing device 13. However, for the purposes of the invention, the components may also be distributed and/or used in different applications. Further, they may be coupled with each other in wired or wireless fashion.

The system 1 is used for determining the pose of a camera with respect to at least one object of a real environment for use in an authoring or augmented reality system. On the displaying means 20, an image of the real environment may be augmented with a virtual object, such as shown in FIG. 5, by displaying the virtual object 40 superimposed with the real environment in the image 30 in accordance with the pose of the camera. The pose (including position and orientation data) of the camera may be, for example, the pose with respect to the real object 31. To this end, the pose may be determined with respect to the coordinate system 33 as shown in FIG. 3, which in turn is associated with the respective object 31.

Figure 1:
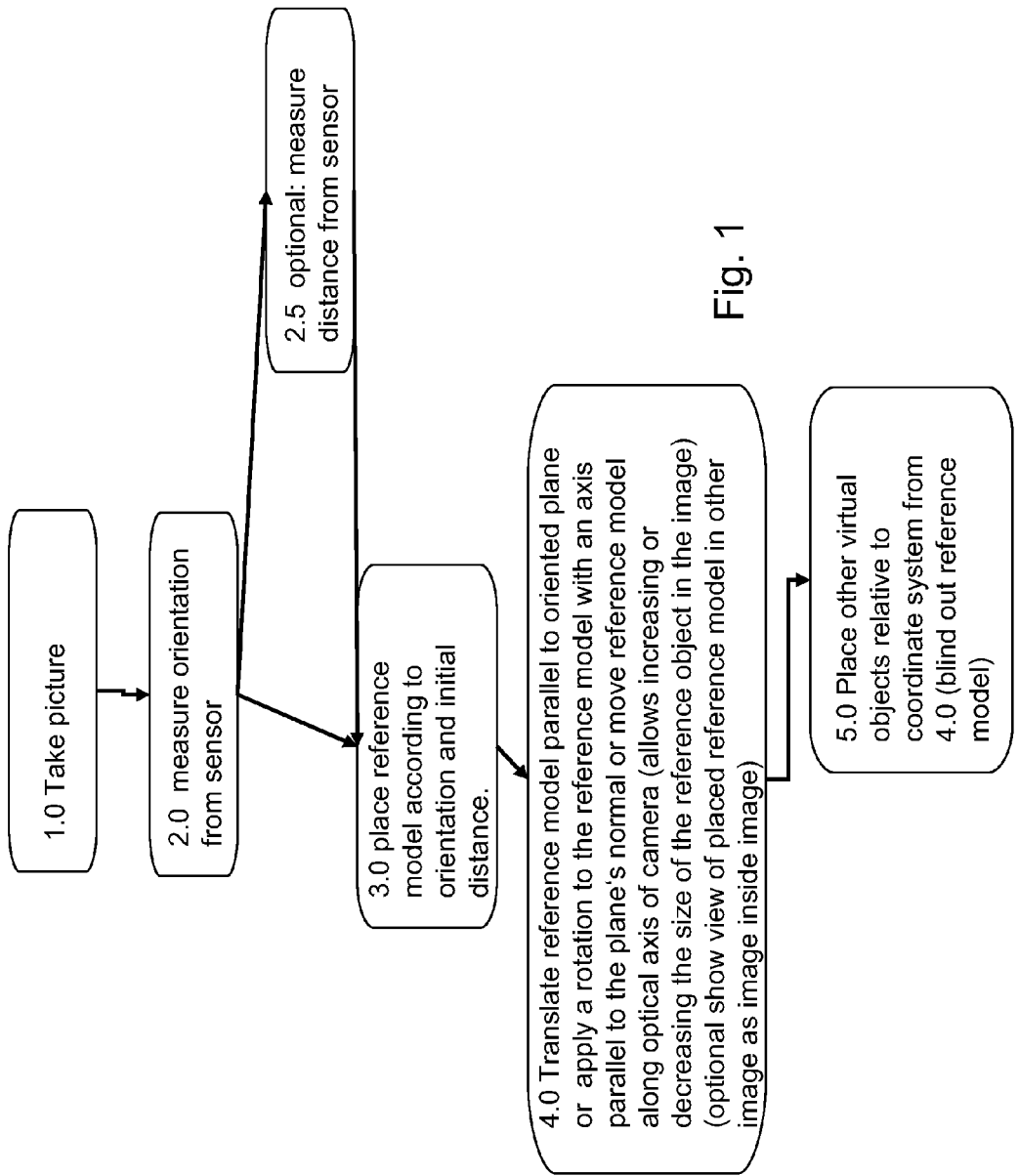
FIG. 1 shows a flowchart illustration of a method according to an embodiment of the invention using a reference model.

In the following, an embodiment of a process according to the invention shall be described in connection with the flow chart as shown in FIG. 1 and in FIG. 6. Particularly, the processing device 13 is arranged to perform the following steps in interaction with the camera 11 and the image displaying device 20:

In step 1.0, the camera 11 takes a first image of the real environment, for example as shown in FIG. 3. At least one orientation sensor 12 is associated with the camera 11 for generating orientation data of the camera in step 2.0. It should be noted, however, that an orientation sensor is not necessary in either case. Rather, the orientation data may alternatively or additionally be generated from an algorithm which analyses the first image for finding and determining features which are indicative of an orientation of the camera. The skilled person will appreciate that such algorithms are known in the art, such as "Orientation from lines" as disclosed in the paper ZuWhan Kim, "Geometry of Vanishing Points and its Application to External Calibration and Realtime Pose Estimation" (Jul. 1, 2006). *Institute of Transportation Studies. Research Reports*. Paper UCB-ITS-RR-2006-5.

Figure 2:
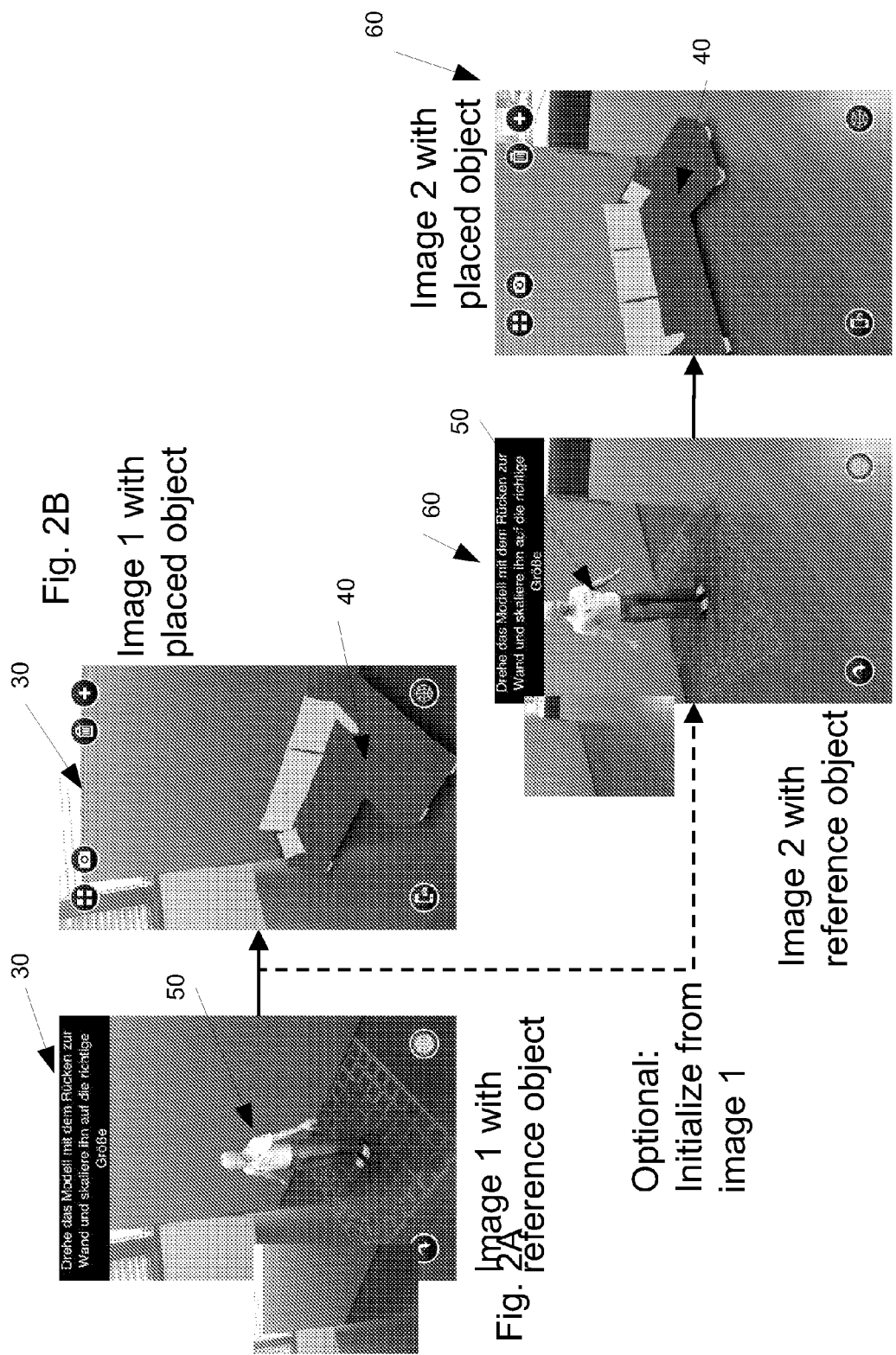
FIG. 2 shows schematic illustrations of an embodiment using a reference model in a process according to FIG. 1 as viewed from the user.

The FIGS. 2A-2D show a scene that is different from the previously described scene of FIGS. 3-5. In FIG. 2, the images as shown in FIGS. 2A, 2B correspond to a first image taken by a camera, such as the first image 30 as previously described. FIGS. 2C, 2D display a respective second image 60 taken by the same or a different camera as described in more detail below. In order to reflect the correspondence of the images with a respective first and second image, the same reference numerals for a first image (30) and a second image (60) are used in connection with the different scenes.

Generally, according to the invention, a means for allocating a distance of the camera 11 to the real object 31 displayed in the image 30 generates distance data that is indicative of the allocated distance of the camera 11 to the real object 31. According to step 3.0 in FIG. 1, providing the means for allocating the distance of the camera to the real object includes providing a virtual reference model that is displayed superimposed with the real environment in the first image 30. The initial distance of the reference object can be one of a fixed value (e.g. 2.5 meters) and a distance provided by a distance sensor. For example, as shown in FIG. 2A, a reference model 50 is placed in the image 30 in accordance with an orientation provided by the orientation sensor 12. The dimensions of the reference model 50 (which may be any kind of virtual model), such as height, width or depth thereof, are known to the system.

One implementation may include: Translate reference model parallel to oriented plane or apply a rotation to the reference model with an axis parallel to the plane's normal or move reference model along the line defined by the camera center and the center of mass of the object, already placed (which allows increasing or decreasing the size of the reference object in the image).

In connection with step 4.0, the system is receiving user's instructions for manipulation of the reference model 50 by the user, the manipulation of the reference model including at least one of moving the reference model 50 at a particular position within the first image 30 on a plane, with the plane defined at least in part by the orientation data, and changing a dimension or variable of the reference model 50, such as moving the reference model 50 and/or changing the height of the reference model 50 (in FIG. 1 designated as moving and scaling the reference model).

In a next step, the distance data between camera 11 and real object 31 is determined using the virtual reference model 50, particularly using its known parameters such as height actually as actually displayed in the image 30. In this regard, the system assumes that the user has correctly placed the reference model 50 within the image, so that the proportions of the reference model 50 correspond to the proportions of the real objects 31, 32 in the image 30. From the dimensions of the reference model 50 the distance between the camera 11 and the real object 31 can be derived taking into account the intrinsic camera parameters. The pose of the camera 11 with respect to the real object 31 (or with respect to the coordinate system 33 which is associated with the object 31) is then determined using the distance data from step 4.0 and the orientation data from step 2.0. The reference model 50 according to its final position and orientation defines the position and orientation of the coordinate system 33. According to step 5.0, at least one virtual object 40 as shown in FIG. 2B or FIG. 5 is superimposed with the real environment in the first image 30 in accordance with the determined pose of the camera. The reference model 50 may be blanked out, as shown in FIG. 2B.

The manipulation of the reference model 50 by the user may include at least one of the following steps: touching the reference model by means of a touchscreen, using two fingers and moving the fingers away from each other to increase the size and moving the fingers closer to each other to decrease the size of the reference model (this might not be necessary, when having a distance measurement from a sensor), touching the reference model by means of a touchscreen with two fingers and rotating the fingers to one another in order to rotate the reference model around an axis perpendicular to the ground plane, touching the reference model with at least one finger and moving the finger in order to move the reference model across a plane.

Another interaction possibility, which might be decided to be activated instead of the interaction method above, when the orientation sensor is indicating, that the camera's view axis is oriented nearly parallel to the ground or looking upwards, is a method, wherein manipulation of the reference model by the user may include at least one of the following steps:

touching the reference model by means of a touchscreen, using two fingers and moving the fingers away from each other to move the model closer to the viewer, the movement taking place on the assumed ground plane and parallel to the intersection of the assumed ground plane with the plane containing the camera center, x in the camera coordinate system being zero.

and touching the reference model by means of a touchscreen, using two fingers and moving the fingers closer to each other to move the model farther from the viewer, the movement taking place on the assumed ground plane and parallel to the intersection of the assumed ground plane with the plane containing the camera center, x in the camera coordinate system being zero.

touching the reference model by means of a touchscreen with two fingers and rotating the fingers to one another in order to rotate the reference model around an axis perpendicular to the assumed ground plane.

touching the reference model with at least one finger and moving the finger up and down in order to move the reference model parallel to the normal of the assumed ground plane.

touching the reference model with at least one finger and moving the finger left and right in order to move the reference model on the assumed ground plane and parallel to the intersection of the assumed ground plane with the plane containing the camera center, y in the camera coordinate system being zero.

According to another embodiment, providing the means for allocating the distance of the camera 11 to the real object 31 includes providing a measurement device, such as a distance sensor, associated with the camera 11 for measuring at least one parameter indicative of the distance between the camera 11 and the real object 31, wherein the distance data are generated on the basis of the at least one parameter. For example, the measurement device includes one of the following devices: a distance provided by a focussing unit of the camera, a distance sensor, at least one time of flight camera, and/or a stereo camera or cameras.

According to the embodiment of FIG. 3, a measurement device 14 may be associated with the camera 11 for measuring a distance between the camera and the object 31. The processing device 13 coupled with the camera 11 is arranged for generating distance data from the measured distance, and for determining an initial pose of the camera with respect to the object 31 using the distance data and the orientation data. The initial pose can be refined in terms of the position on the ground plane and the rotation around the axis parallel to the plane's normal. In this regard, FIG. 4 shows an example of how to determine the pose of the camera 11 knowing the distance to the focused object (which is in FIG. 4 different from table 31) and two angles describing the normal to the ground plane provided by the orientation sensor. One possibility to create the rotation matrix describing the plane's rotation to the camera is to set the first matrix column as the gravity vector (which might be provided by the orientation sensor). The second matrix vector is set as an arbitrary vector parallel to the plane perpendicular to the gravity vector. The third matrix column can be obtained using the cross product of the two other columns. All columns should be normalized.

Figure 6:
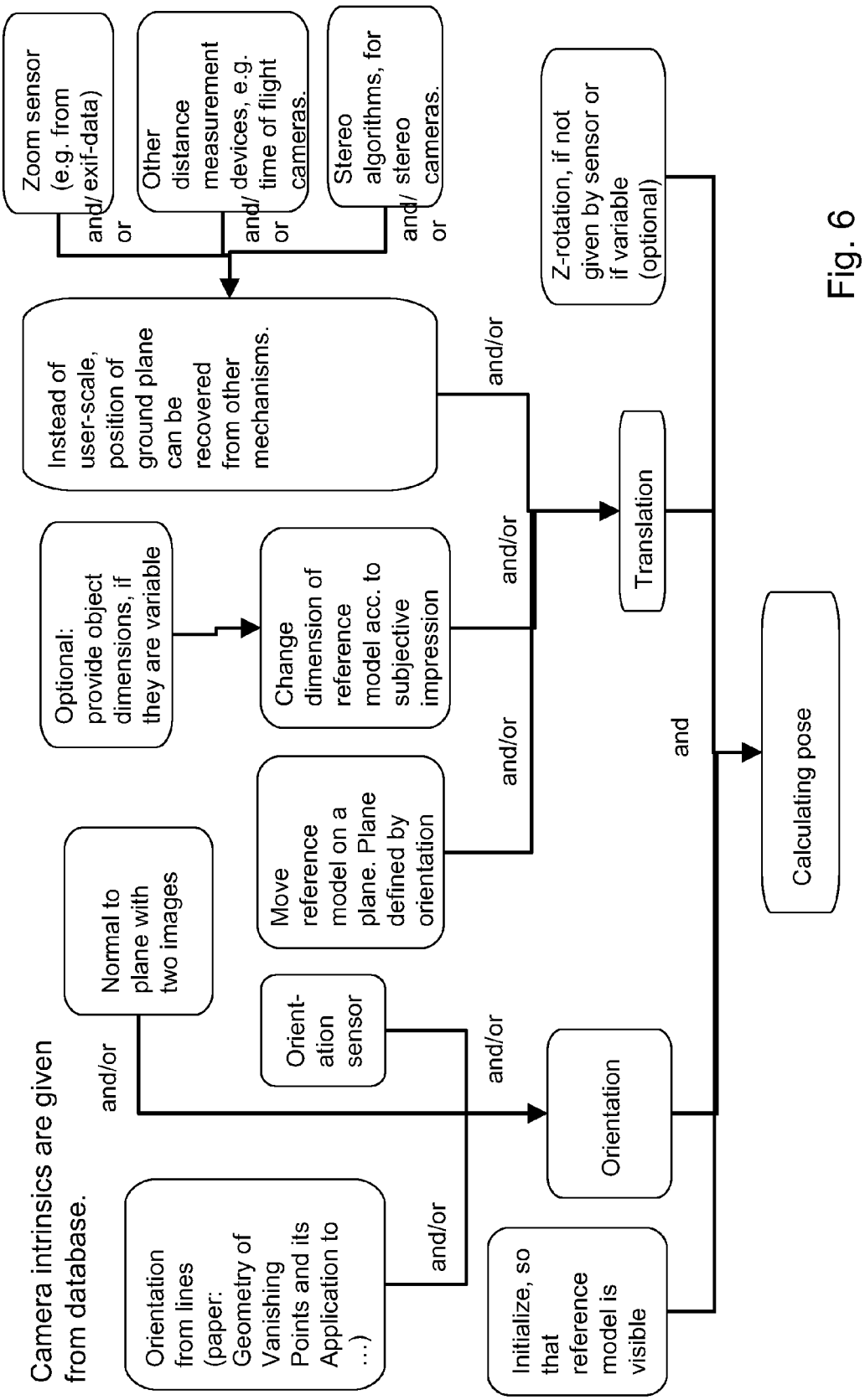
FIG. 6 shows a flowchart illustration of an embodiment of a method according to the invention for calculating a placement coordinate system in an image taken by a camera.

In an embodiment of the invention, the method may further include providing a parameter indicative of a rotation of the camera around an axis which is perpendicular to the earth ground plane, e.g., provided by a rotation sensor or a compass (in FIG. 6 designated as z-rotation). This makes the second matrix vector, as described above, not arbitrary. Models, which are related to the earth's coordinate system, e.g. sign showing north, could be initially oriented correctly.

In a further approach, providing the means for allocating the distance of the camera 11 to the real object 31 may include providing at least one parameter indicative of a distance between two features of the real environment which are visible in the image 30, such as a distance between the stand of the table 31 and one edge of the cabinet 32 and using the intrinsic camera parameters. Another helpful example is providing the distance of two features located on the ground plane. The parameter may be provided, interactively by the user, after an appropriate image processing algorithm, shows detected features and the user providing a distance from his knowledge of the real environment.

Any of the above approaches for providing the means for allocating the distance of the camera 11 to the real object 31 may also be combined in any suitable manner.

As shown in FIG. 3, the distance data and the orientation data are used to determine at least one placement coordinate system in the image 30, such as coordinate system 33, wherein the at least one virtual object 40 is superimposed with the real environment relative to the placement coordinate system 33. When having only one image, the system may not precisely determine the ground plane for allocating a corresponding coordinate system thereon, without, e.g. a distance sensor directed toward the ground. In this regard, it is assumed that the placement coordinate system 33 is approximately the ground coordinate system. The ground plane and, thus, the ground coordinate system may be determined by means of a second image of the same scenery taken from a different pose of the camera, as explained in more detail below.

With respect to FIG. 5, showing a virtual model 40 superimposed with the real environment, it should be noted that the virtual model 40 may also serve as the reference model 50 as discussed above with respect to FIG. 2A.

With superimposing the virtual model 40 in the room as shown in the image 30, the user may get an impression of how a real sofa corresponding to the virtual model 40 would look like if placed in the room of the real world. Therefore, the user may use his or her mobile phone for taking an image and for augmenting the image with virtual objects of any kind, wherein the skilled person is aware of a wide variety of applications. Another application for example could be placing objects in pictures of the real world and having a GPS position of the camera and an absolute orientation and determining the pose of a virtual model 40 using this invention, allowing to feed a global database of objects positioned on the earth, like GOOGLE® Earth.

In FIG. 6, the process as explained above is shown in more detailed manner, as discussed above. In the initializing step, a distance of the reference model 50 is initially assumed. With moving the reference model 50 on a plane (with the plane being parallel to the ground plane) and/or with changing a dimension/parameter of the reference object according to the subjective impression of the user, the necessary translation data may be determined.

An algorithm following the "Orientation from lines" approach for determining the orientation of the camera instead of using an orientation sensor is explained in more detail with reference to FIG. 7:

Vanishing points are the images of the intersection of parallel lines. Let vx, vy, vz be the vanishing points. vx is the image of "the point at infinity Ix=(1,0,0,0)" (the x axis), vy is the image of "the point at infinity Iy=(0,1,0,0)" (the y axis), vz is the image of "the point at infinity Iz=(0,0,1,0)" (the z axis). Further, let the homogeneous coordinates of vx be vx=[u1, v1, w1]=K*[R t]*Ix. It is possible to get the first column of the matrix R using inv(K)*vx and then normalizing it to 1. Further, let the homogeneous coordinates of vy be vy=[u2, v2, w2]=K*[R t]*Iy. It is possible to get the second column of the matrix R using inv(K)*vy and then normalizing it to 1. Finally, let the homogeneous coordinates of vz be vz=[u3, v3, w3]=K*[R t]*Iz. It is possible to get the third column of the matrix R using inv(K)*vz and then normalizing it to 1. If only two points among vx, vy and vz are available then it is still possible to compute the third using the cross-product, e.g. vz=vx^vy. See Z. Kim, "Geometry of vanishing points and its application to external calibration and realtime pose estimation," Inst. Transp. Stud., Res. Rep. UCB-ITS-RR-2006-5, Univ. Calif, Berkeley, Calif., 2006 for more details.

In accordance with FIG. 8, a method will be explained in more detail for calculating a ground coordinate system on the basis of at least one second image or more images of the same scenery but taken from a different pose.

The method includes the step of generating a second image 60 by a camera (which may be the same or a different camera for which the intrinsic parameters are also known than the camera which took the first image) capturing the real object (e.g. object 31 of image 30) of the real environment from a different pose.—

In a further step, at least one respective feature from the first image 30 and the second image 60 are extracted, wherein the respective features are matched to provide at least one relation indicative of a correspondence between the first image and the second image (the relation is designated in FIG. 8 in step A2 as "fundamental matrix" which is defined up to a scale (For more details see chapter 11 of Multiple View Geometry in Computer Vision. Second Edition. Richard Hartley and Andrew Zisserman, Cambridge University Press, March 2004). Te scale designated as "alpha" is determined in step B5). According to step A1, second orientation data derived from the new pose when taking the second image might be used to reduce the amount of needed features or to check the result of the fundamental matrix. As a result, the placement coordinate system 33 of the first image may be transitioned to the second image.

The calculation of the fundamental matrix can of course be supported by the use of the orientation sensors, reducing the amount of necessary feature matches.

In the following, the calculation of the missing "alpha" is explained in more detail:

From point correspondences between the first image (image1) and the second image (image2), one can build the Fundamental matrix:

$$F=K2^{-T}[t]_x R K1^{-1}$$

where K1 is the camera intrinsic parameter matrix of the camera, which acquired the first image, and K2 is the intrinsic parameter matrix of the camera, which acquired the second image, t is the translation between the two camera views and R is the rotation.

Let p1 and p2 be two corresponding points in image1 and image2, they verify:

$$p_2^T F p_1 = 0$$

So F is defined up to a scale. Having K and F it is possible to get the essential matrix $$E=[t]_x R$$

up to a scale. The essential matrix can also be computed directly from point correspondences. Therefore to get the translation t up to a scale and the rotation R (for more information see B. Horn: Recovering baseline and orientation. from essential matrix. Journal. of. the Optical Society. of. America, January 1990.). Now if a plane is visible in both images it is possible to compute the homography that transforms every point on this plane in the image1 to its corresponding point in the image2. The homography can be written:

$$G=K2(R+t/d\, n^T)K1^{-1}$$

where n is the normal vector, expressed in the first camera view, to the plane and d is the distance between the camera center of the first view and the plane. If we know that the two images contain the plane and that the plane has many feature points, the detection of the points lying on the plane is very easy, for example: the biggest set of points that are verifying the same homography. Another possibility to detect a plane is to reconstruct the 3D-points out of correspondences and find the plane that includes a high number of 3D-points (and optionally being nearly parallel to the plane from the orientation in claim 1, e.g. to reduce the search-space and improve robustness). From the homography G, we can get R (again) and we can get t/d and we can get n (use the algorithm of Motion and Structure From Motion in a Piecewise Planar Environment by: OD Faugeras, F Lustman Intern. J. of Pattern Recogn. and Artific. Intelige., Vol. 2, No. 3. (1988), pp. 485-508.

From here we can see the problem to be solved, that having the scale of t will give us d, and having d will give us the scale of t ("alpha"). The translation between the two views (odometrie in cars or GPS, . . . ) will give us the scale of t. The distance of one feature $p_1$ gives us the depth z of this feature and we know that:

$$z p_1 = K1[xyz]$$

When p is on the plane, we have $n^T [xyz]=d$, this means $d=z\, n^T K1^{-1} p_1$.

When $p_1$ is not on the plane, we need to solve $$K2(zRK1^{-1} p_1 + \text{alpha}\, t_0) = \text{beta}\, p_2$$

where $t_0$ is a vector collinear to the true translation, with a norm equal to 1 and the unknowns are alpha and beta and the solution is very easy to find (more equations than unknowns).

The distance between two features X=[x y z] and X'=[x' y' z'] allows to get the scale of t:

In fact $\|X-X'\|=\|zK1^{-1} p_1 - z'K1^{-1} p_1'\|$ is given. Using the equation $$K2(zRK1^{-1}p_1+\text{alpha}\, t)=\text{beta}\, p_2$$

we can express z and z' using such that z=A alpha and z'=A' alpha where A depends only on K, R, t (up to the scale), $p_1$ and $p_2$ while A' depends only on K1, K2, R, t (up to the scale), $p_1'$ and $p_2'$ (these parameters are either supposed given or computed above).

$$\text{alpha}=\|X-X'\|/\|A-A'\|$$

In step C1, the pose of the camera with respect to the real object in the first image is provided from the previous process with respect to the first image, and the pose of the camera with respect to the real object in the second image is determined using the pose of the camera with respect to the real object in the first image and the at least one relation, i.e. the fundamental matrix and "alpha" for determining the translation parameters tx, ty, tz of the pose which is consisting of the parameters tx, ty, tz, rx, ry, rz (with "t" standing for translation and "r" standing for rotation parameters in the three different dimensions) defining the position and orientation of the camera.

Particularly, the distance data and the first orientation data recorded with respect to the first image were used to determine at least one placement coordinate system (such as coordinate system 33) in the first image and a position and orientation thereof in the first image (as discussed above), wherein the fundamental matrix and "alpha" are used for allocating the placement coordinate system in the second image with a position and orientation corresponding to the respective position and orientation in the first image. This is shown in FIG. 2C in which the reference model 50 of FIG. 2A (positioned in accordance with the placement coordinate system 33) is shown in the second image 60 (positioned in accordance with the "transferred" placement coordinate system 33) with a position and orientation corresponding to the respective position and orientation in the first image 30 (i.e. with the back of the reference model turned to the wall as in the first image 30)

According to an embodiment, the step of providing the at least one relation (fundamental matrix and alpha) may further include one or more of the following steps:

Providing at least one parameter indicative of a movement of the camera between taking the first image and the second image (step B1). For example, providing at least one parameter in step B1 may include providing a first location parameter of the camera when taking the first image and a second location parameter of the camera when taking the second image, the location parameters generated by a positioning system or detector, such as used with GPS. At least one of the first and second location parameters may be generated by at least one of a satellite locating system, wireless network positioning mechanisms, mobile phone cell location mechanisms and an elevation measuring device, such as an altimeter. Note, that the measurement of one translation dimension (from tx, ty, tz) or the norm of t are sufficient to solve for alpha.

Providing at least one parameter indicative of a distance between two features of the real environment which are visible in both the first and second images (step B2). Optionally, using 2D-3D-correspondences created from scale given by reference model 50 (and optionally assuming the reference model being on one plane) (step B3) may be applied for providing input to step B2.

Providing at least one parameter indicative of a distance between two features of the real environment which are visible in one of the images (step B2) by assuming they are on the plane and assuming the reference model 50 is placed on the plane, the dimensions of the reference model providing a scale for the distance between the two features.

Also, a database of features, including 3D positions or feature distances, near the position of one of the cameras could be queried for feature correspondences between features in one of the images and features in the database. This database could be created using sources of images, taken at known poses, like GOOGLE® Streetview. Matching features from overlapping images at two positions and using the mechanisms described above.

Providing at least one parameter indicative of a distance between at least one feature, which is matched in both images, of the real environment and one camera (step B4). For example, a feature extracted close to the center of projection of the camera or close to where the distance measurement unit is aiming.

Further in step C1, after having placed the placement coordinate system in the second image with a position and orientation corresponding to the respective position and orientation in the first image, the pose to the placement coordinate system in both images is determined. Further, the 3D position of all matched feature correspondences in both images is determined. In step C2, either using the 3D positions of features or using the homography constraint, described above, the main plane can be determined, e.g. the ground plane.

Proceeding with step C3, the placement coordinate system in the first image is positioned to be on the ground plane, e.g. by moving it along the plane's normal.

The FIGS. 9-12 show a scenery which is different from the previously described scenes. In FIGS. 9-12, the images as shown in FIGS. 9-11 correspond to a first image taken by a camera, thus is designated with reference numeral 30 as with the previous described scenes. On the other hand, FIG. 12 displays a second image taken by the same or a different camera corresponding to the second image 60 as previously described.

Turning to step C4, as shown in FIGS. 9-12, the method proceeds with superimposing at least one virtual object (such as object 71a in FIG. 9, which may be a reference model or any virtual object to be superimposed with the real world) with the real environment in accordance with the placement coordinate system 33a as determined in the first image. Thereafter, the virtual object is superimposed with the real environment in accordance with the placement coordinate system 33a now positioned on the previously determined ground plane in the first image (now displayed as object 71b in FIG. 9 after moving the coordinate system 33a to the determined ground plane, the new positioned coordinate system designated as 33b). The process continues with moving the placement coordinate system 33b along the ground plane (in other words, adjust x,y). As shown in FIG. 10, the placement coordinate system 33b is moved and positioned on the ground plane in that the projection of the virtual object in accordance with the (original) placement coordinate system 33a in the first image (object 71a) substantially equals or comes near (i.e. substantially corresponds to) the projection of the virtual object in accordance with the placement coordinate system 33b moved and positioned on the ground plane (object 71b). As shown in FIG. 11, the process may continue with optionally scaling the virtual object 71b (i.e. change a dimension such as height thereof) so that it corresponds to the original dimension of the virtual object (object 71a) which was placed by the user originally in the first image 30.

Another possibility to achieve this is to shoot a ray from the camera center on a point of the object (e.g. located in the lower part). The next step is intersecting the ray with the plane. Then, finally, we render the virtual object such that the point is superimposed with the intersection point.

The process of correcting the position of objects might be done for all placed virtual objects individually not necessarily changing the placement coordinate system, but the relationship (tx,ty,tz, ry,ry,rz) of the virtual model to the placement coordinate system.

As shown in FIG. 12, the virtual object 71b is now superimposed with the real environment in accordance with the moved placement coordinate system on the ground plane in a second image 60, wherein FIG. 12 shows that the placement coordinate system as assumed in the first image 30 may be displaced from the actual ground plane.

It should be noted, that the superimposing of virtual objects 71a, 71b may be performed in the background, i.e. is not displayed on the display screen, but is only superimposed in the algorithm for determining the final placement coordinate system positioned correctly on the ground plane. This ground plane may be used in any further image for superimposing any virtual object with the real environment, irrespective of the respective perspective of the further image.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

What is claimed is:

1. A method for determining the pose of a camera with respect to at least one object of a real environment for use in an authoring or augmented reality application, comprising:
    generating a first image comprising at least one image by a camera capturing a real object of a real environment;
    generating first orientation data describing a normal to a ground plane within a coordinate system from at least one orientation sensor associated with the camera or from an algorithm which analyses the first image to find and determine features which are indicative of an orientation of the camera;
    obtaining a virtual reference model within said coordinate system, wherein said virtual reference model represents a known sized object;
    displaying said virtual reference model superimposed with the real environment at a position in the first image and providing an initial distance from the camera to the virtual reference model;
    receiving user instructions to manipulate the virtual reference model by a user, then modifying the position or orientation of the virtual reference model resulting in at least a change in the position of the virtual reference model within the real environment, including at least one of
        moving the position of the virtual reference model within the first image on a plane, with the plane defined at least in part by the first orientation data,
        zooming the virtual reference model to alter the position, rotating the virtual reference model;
    calculating a distance of the camera to the real object of the real environment displayed in the first image according to the position of the virtual reference model based on said manipulating of the virtual reference model by the user, and generating distance data that is indicative of the distance;

determining a pose of the camera with respect to said coordinate system associated with said virtual reference model and related to the real object of the real environment using the distance data and the first orientation data.

2. The method of claim 1, wherein the manipulating of the virtual reference model by the user may include at least one of:
   touching the virtual reference model using a touchscreen, using two fingers and moving the two fingers away from each other to increase a size and moving the two fingers closer to each other to decrease the size of the virtual reference model;
   touching the virtual reference model using a touchscreen with the two fingers and rotating the two fingers about one another in order to rotate the virtual reference model around an axis perpendicular to a ground plane;
   touching the virtual reference model with at least one finger and moving the at least one finger in order to move the virtual reference model across the plane.

3. The method of claim 1, wherein manipulation of the virtual reference model by the user may include at least one of:
   touching the virtual reference model using a touchscreen, using two fingers and moving the two fingers away from each other to move the virtual reference model closer to a viewer, wherein the move takes place on an assumed ground plane and parallel to an intersection of the assumed ground plane with a plane containing a camera center, x in a camera coordinate system being zero;
   touching the virtual reference model using a touchscreen, using the two fingers and moving the two fingers closer to each other to move the virtual reference model farther from the viewer, wherein the move takes place on the assumed ground plane and parallel to the intersection of the assumed ground plane with the plane containing the camera center, x in the camera coordinate system being zero;
   touching the virtual reference model using the touchscreen with the two fingers and rotating the two fingers about one another in order to rotate the virtual reference model around an axis perpendicular to the assumed ground plane;
   touching the virtual reference model with at least one finger and moving the at least one finger up and down in order to move the virtual reference model parallel to a normal of the assumed ground plane;
   touching the virtual reference model with the at least one finger and moving the at least one finger left and right in order to move the virtual reference model on the assumed ground plane and parallel to the intersection of the assumed ground plane with the plane containing the camera center, y in the camera coordinate system being zero.

4. The method of claim 1, wherein allocating the distance of the camera to the real object includes providing a measurement device associated with the camera that measures at least one parameter that is indicative of the distance between the camera and the real object, wherein the distance data is generated based on the at least one parameter.

5. The method of claim 4, wherein the providing the measurement device includes providing at least one of: a focusing unit of the camera, an independent distance sensor, at least one time of flight camera, a stereo camera or cameras.

6. The method of claim 1, further comprising providing a parameter indicative of a rotation of the camera around an axis that is perpendicular to an Earth ground plane.

7. The method of claim 1, wherein the allocating the distance of the camera to the real object includes providing at least one parameter indicative of a distance between two features of the real environment which are visible in the first image.

8. The method of claim 1, further including displaying at least one virtual object superimposed with the real environment in the first image in accordance with the pose of the camera with respect to the coordinate system related to the real object of the real environment.

9. The method of claim 8, determining at least one placement coordinate system in the first image using the distance data and the first orientation data, wherein the at least one virtual object is superimposed with the real environment relative to the at least one placement coordinate system.

10. The method of claim 1, further comprising:
    generating a second image by the camera capturing the real object of the real environment;
    extracting at least one respective feature from the first image and the second image and matching the at least one respective feature therein providing at least one relation that is indicative of a correspondence between the first image and the second image; and,
    providing the pose of the camera with respect to the coordinate system related to the real object in the first image, and determining the pose of the camera with respect to a second coordinate system related to the real object in the second image using the pose of the camera with respect to the coordinate system related to the real object in the first image and the at least one relation.

11. The method of claim 10, further comprising generating second orientation data associated with the second image from the at least one orientation sensor.

12. The method of claim 10, further comprising:
    determining at least one placement coordinate system in the first image and a first position and orientation thereof in the first image using the distance data and the first orientation data; and,
    allocating a second at least one placement coordinate system in the second image with a second position and orientation corresponding to the respective position and orientation in the first image using the at least one relation.

13. The method of claim 12, further comprising:
    extracting at least one second respective feature from the first image and the second image and determining a ground plane in both the first image and the second image and moving a placement coordinate system to be positioned on the ground plane.

14. The method of claim 13, further comprising:
    superimposing at least one virtual object with the real environment in accordance with the placement coordinate system in the first image;
    superimposing the at least one virtual object with the real environment in accordance with the placement coordinate system positioned on the ground plane in the first image;
    moving the placement coordinate system along the ground plane to be positioned in that a projection of the at least one virtual object in accordance with the placement coordinate system in the first image substantially equals or comes near the projection of the at least one virtual object in accordance with the placement coordinate system positioned on the ground plane.

15. The method of claim 14, further comprising superimposing the at least one virtual object with the real environment in accordance with the placement coordinate system on the ground plane.

16. The method of claim 10, wherein the providing the at least one relation further includes at least one of the following:
providing at least one parameter indicative of a movement of the camera between capturing the first image and the second image;
providing a second at least one parameter indicative of a distance between two features of the real environment which are visible in both the first image and the second image;
providing a third at least one parameter indicative of a distance between at least one feature of the real environment and the camera.

17. The method of claim 16, wherein providing the at least one parameter indicative of the movement of the camera between taking the first image and the second image includes providing a first location parameter of the camera when taking the first image and a second location parameter of the camera when taking the second image.

18. The method of claim 17, generating at least one of the first and second location parameters by at least one of a satellite locating system, and an elevation measuring device.

19. The method of claim 1, further comprising providing a virtual reference model which is displayed superimposed with the real environment in the first image, placing the virtual reference model on an assumed ground plane and identifying in the first image at least two features of the real environment on the assumed ground plane near the virtual reference model, wherein a distance between the at least two features is determined using a known dimension of the virtual reference model.

20. A method for determining the pose of a camera with respect to at least one object of a real environment for use in an authoring or augmented reality application, comprising:
generating at least one image by a camera capturing an object of a real environment;
generating orientation data within a coordinate system from at least one orientation sensor associated with the camera or from an algorithm which analyses the at least one image and finding and determining features which are indicative of an orientation of the camera;
providing a measurement device associated with the camera configured to measure at least one parameter that is indicative of distance between the camera and the object;
determining a pose of the camera with respect to said coordinate system related to the object of the real environment based on the at least one parameter and the orientation data;
obtaining a virtual reference model within said coordinate system, wherein said virtual reference model represents a known sized object;
displaying said virtual reference model within the image on a plane at a position, with the plane defined at least in part by the orientation data and the parameter that is indicative of distance; and,
receiving user instructions to manipulate the virtual reference model by a user, then modifying the position or orientation of the virtual reference model resulting in at least a change in the position of the virtual reference model, including at least one of
moving the position of the virtual reference model within the at least one image on a plane, with the plane defined at least in part by the orientation data,
zooming the virtual reference model to alter the position,
rotating the virtual reference model.

21. A system for determining the pose of a camera with respect to at least one object of a real environment for use in an authoring or augmented reality system, comprising:
at least one camera configured to generate at least one image capturing at least one object of a real environment;
at least one orientation sensor associated with the at least one camera, configured to generate orientation data of the at least one camera within a coordinate system;
a measurement device associated with the at least one camera, configured to measure a distance between the at least one camera and the at least one object; and,
a processing device coupled with the at least one camera, wherein the processing device is configured to
generate distance data from the distance, and
determine a pose of the at least one camera with respect to said coordinate system related to the at least one object of the real environment through use of the distance data and the orientation data;
obtain a virtual reference model within said coordinate system, wherein said virtual reference model represents a known sized object;
display said virtual reference model within the image on a plane at a position, with the plane defined at least in part by the orientation data and the distance data; and,
receive user instructions to manipulate the virtual reference model by a user, to at least change the position of the virtual reference model, including at least one of an instruction to
move the position of the virtual reference model within the at least one image on a plane, with the plane defined at least in part by the orientation data,
zoom the virtual reference model to alter the position,
rotate the virtual reference model.

22. The system of claim 21, wherein the system is included in a mobile device.

23. The system of claim 22, wherein the mobile device is a mobile telephone.

24. A method for determining the pose of a camera with respect to at least one object of a real environment for use in an authoring or augmented reality application, comprising:
generating a first image comprising at least one image by a camera that captures a real object of a real environment;
generating first orientation data describing a normal to a ground plane within a coordinate system from at least one orientation sensor associated with the camera or from an algorithm which analyses the first image to find and determine features which are indicative of an orientation of the camera or by user-interaction;
obtaining a virtual reference model within said coordinate system, wherein said virtual reference model represents a known sized object;
displaying said virtual reference model superimposed with the real environment at a position in the first image and providing an initial distance from the camera to the virtual reference model;
receiving user instructions to manipulate the virtual reference model by a user, then modifying the position or orientation of the virtual reference model resulting in at least a change in the position of the virtual reference model within the real environment, including at least one of moving the position of the virtual reference model within the at least one image on a plane, with the plane defined at least in part by the orientation data to alter the position, zooming the virtual reference model to alter the position, rotating the virtual reference model;

calculating a distance of the camera to the real object of the real environment displayed in the first image according to the position of the virtual reference model based on said manipulating of the virtual reference model by the user, and generating distance data that is indicative of an allocated distance of the camera to the real object;

determining a pose of the camera with respect to said coordinate system associated with said virtual reference model and related to the real object of the real environment in the first image using the distance data and the first orientation data;

generating a second image by the camera that captures the real object of the real environment;

extracting at least one respective feature from the first image and the second image and matching the at least one respective feature to provide at least one relation that is indicative of a correspondence between the first image and the second image;

providing the pose of the camera with respect to the coordinate system related to the real object in the first image, and determining the pose of the camera with respect to a second coordinate system related to the real object in the second image using the pose of the camera with respect to the coordinate system related to the real object in the first image and the at least one relation; and, extracting at least one second respective feature from the first image and the second image and determining a ground plane in both the first image and the second image and moving a placement coordinate system to be positioned on the ground plane.

25. The method of claim 24, further including moving the placement coordinate system and indicating the pose of a virtual object in respect to a real object on the ground plane in that the projection of the virtual object in accordance with the original placement coordinate system in the first image substantially equals or comes near the projection of the virtual object in accordance with the placement coordinate system moved and positioned on the ground plane.

26. The method of claim 25, wherein allocating a distance of the camera to the real object of the real environment displayed in the first image includes scaling the virtual object by user interaction.

* * * * *